(12) United States Patent
Imamura et al.

(10) Patent No.: US 8,176,775 B2
(45) Date of Patent: May 15, 2012

(54) TIRE INFLATION METHOD FOR TIRE TESTING MACHINE

(75) Inventors: Morihiro Imamura, Tokyo (JP); Makoto Tachibana, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/953,809

(22) Filed: Nov. 24, 2010

(65) Prior Publication Data

US 2011/0203362 A1   Aug. 25, 2011

(30) Foreign Application Priority Data

Feb. 19, 2010   (JP) .................................. 2010-034219

(51) Int. Cl.
*G01M 17/02* (2006.01)
(52) U.S. Cl. .......................................... 73/146
(58) Field of Classification Search ......................... None
See application file for complete search history.

(56) References Cited

U.S. PATENT DOCUMENTS

| | | | | |
|---|---|---|---|---|
| 3,935,748 | A * | 2/1976 | Lannen | 73/484 |
| 5,992,227 | A * | 11/1999 | Jellison et al. | 73/146 |
| 6,673,184 | B1 * | 1/2004 | Brown et al. | 156/133 |
| 7,311,872 | B2 * | 12/2007 | Mitamura et al. | 264/502 |
| 2005/0173074 | A1 * | 8/2005 | Routt et al. | 157/19 |
| 2005/0188755 | A1 | 9/2005 | Cargould et al. | |
| 2007/0084275 | A1 * | 4/2007 | Gotou et al. | 73/146 |
| 2007/0220964 | A1 * | 9/2007 | Shinomoto et al. | 73/146 |
| 2009/0123585 | A1 * | 5/2009 | Himeno et al. | 425/38 |
| 2011/0113875 | A1 * | 5/2011 | Okada et al. | 73/146 |

FOREIGN PATENT DOCUMENTS

| | | |
|---|---|---|
| JP | 1192532 A | 8/1989 |
| JP | 3418512 B2 | 6/2003 |
| JP | 3802452 B2 | 7/2006 |
| JP | 3904318 B2 | 4/2007 |
| JP | 4011632 B2 | 11/2007 |
| JP | 4210642 B2 | 1/2009 |
| WO | 98/34801 A2 | 8/1998 |

OTHER PUBLICATIONS

Extended European Search Report for Application No. 10190886.1 mailed Jul. 4, 2011.

* cited by examiner

*Primary Examiner* — Andre Allen
(74) *Attorney, Agent, or Firm* — Kanesaka Berner & Partners

(57) ABSTRACT

In a tire testing machine, a test tire transported onto a belt conveyor is entrusted to a lower rim by lowering the belt conveyor. In this state, an upper rim is lowered to the position of the lower rim, whereby the upper and lower rims are fitted to the test tire, and then the test tire is inflated. An inflation method for the tire testing machine comprises stopping the belt conveyor at an intermediate position, without lowering the belt conveyor to a descent limit, when entrusting the test tire to the lower rim by lowering the belt conveyor; and inflating the test tire, with the weight of the test tire being shouldered by the belt conveyor as well.

2 Claims, 4 Drawing Sheets

TIRE INFLATION METHOD FOR TIRE TESTING MACHINE

RELATED APPLICATIONS

The present application is based on, and claims priority from, Japanese Application Number 2010-034219, filed Feb. 19, 2010, the disclosure of which is hereby incorporated by reference herein in its entirety.

TECHNICAL FIELD

This invention relates to a tire inflation method in a tire testing machine such as a tire uniformity machine for measuring the nonuniformity of a tire.

BACKGROUND ART

With this type of tire testing machine, there are roughly two methods available for fitting together an upper rim, a lower rim, and a tire to be tested (may be called a test tire).

One of them is a method in which an ascendable/descendable lower rim located below a tire transport device lifts from below a test tire, which has been transported onto the tire transport device, up to the position of an upper rim stationarily placed on standby above the tire transport device, thereby fitting the upper and lower rims and the test tire together, as disclosed in Patent Document 1.

The other method is a method in which a test tire, transported onto a tire transport device, is entrusted to a lower rim stationarily located below the tire transport device by lowering the tire transport device; and, in this state, an upper rim placed in an ascendable/descendable manner on standby above the tire transport device is lowered to the position of the lower rim, whereby the upper and lower rims and the test tire are fitted together, as disclosed in Patent Document 2.

[Citation List]
[Patent Literature]
[Patent Document 1] Japanese Patent No. 3418512
[Patent Document 2] Japanese Patent No. 4011632

SUMMARY OF INVENTION

Technical Problem

In recent years, however, there have occurred circumstances in which neither of the above-mentioned methods is able to fit the test tire to the upper and lower rims and complete air inflation, for reasons set forth below.

If the weight of the test tire is heavy, or if the side wall of the test tire is soft, the following situation occurs: As shown in FIG. 4, a tire T to be tested (may be called a test tire T) is entrusted via its lower bead portion Tb to a lower rim 101 attached to a lower spindle 100. In this state, an upper rim 103 attached to an upper spindle 102 is approached to and positioned at the test tire T, with a prescribed rim width. On this occasion, the test tire T sags by its own weight. As a result, a clearance between the upper rim 103 and an upper bead portion Ta of the test tire T increases, and air escapes through the increased clearance (see oblique upward arrows in the drawing). This inhibits the inflation of the test tire T. In the drawing, the numeral 104 denotes a tire transport device (conveyor) constituting a part of a transport line for the test tire T. The tire transport device is configured to be ascendable and descendable in a measurement unit of a tire testing machine.

As a measure against the above-mentioned problem, the adoption of a so-called air curtain mode is conceivable. The air curtain mode involves blowing air from outside toward the clearance between the upper rim and the upper bead portion of the test tire, thereby preventing the above-mentioned air leakage through this clearance.

However, even the air curtain mode is limited in capacity. This mode is lacking in reliability for the test tire having a large diameter and a heavy weight, and releases a large amount of air to the atmosphere, thus posing the problems of an increased energy consumption and noise.

A method known as another measure comprises once stopping the above upper rim at a position where its rim width is smaller than the prescribed rim width to eliminate the clearance between the upper rim and the upper bead portion of the test tire, and then lifting the upper rim to a position, where the prescribed rim width is reached, according to the inflated state of the test tire.

In the case of a tire whose prescribed rim width is inherently small, however, further narrowing of the rim width is difficult in terms of mechanical dimensions. Thus, the above method cannot be an effective method.

The present invention has been accomplished in the light of the above-mentioned earlier technologies. It is an object of this invention to provide a tire inflation method for a tire testing machine with high reliability which can reliably complete the inflation of a tire with air with the effective use of existing equipment.

Solution to Problem

A first aspect of the present invention for solving the above problems is an inflation method for a tire testing machine, the tire testing machine being configured such that a test tire transported onto a tire transport device is entrusted to a lower rim by lowering the tire transport device; with the test tire so entrusted, an upper rim is lowered to a position of the lower rim, whereby the upper and lower rims are fitted to the test tire; and then air is supplied between the upper and lower rims to inflate the test tire, the inflation method comprising:
stopping the tire transport device at an intermediate position, without lowering the tire transport device to a descent limit, when entrusting the test tire to the lower rim by lowering the tire transport device; and
inflating the test tire, with a weight of the test tire being shouldered by the tire transport device as well.

According to a second aspect of the present invention, the intermediate position of the tire transport device when stopped may be arbitrarily changed in accordance with a prescribed rim width dimension and a tire width dimension of the test tire.

Advantageous Effects of Invention

With the tire inflation method for a tire testing machine according to the present invention, the ascending and descending actions of the existing tire transport device are changed, whereby the occurrence of a clearance between the upper rim and the upper bead portion of the test tire during tire inflation can be suppressed. As a result, tire inflation can be completed reliably by a simple method, while preventing air leakage, without inducing a cost increase.

DESCRIPTION OF EMBODIMENTS

The tire inflation method for a tire testing machine according to the present invention will now be described in detail based on embodiments of the invention by reference to the accompanying drawings.

[Embodiment]

Figure 1:
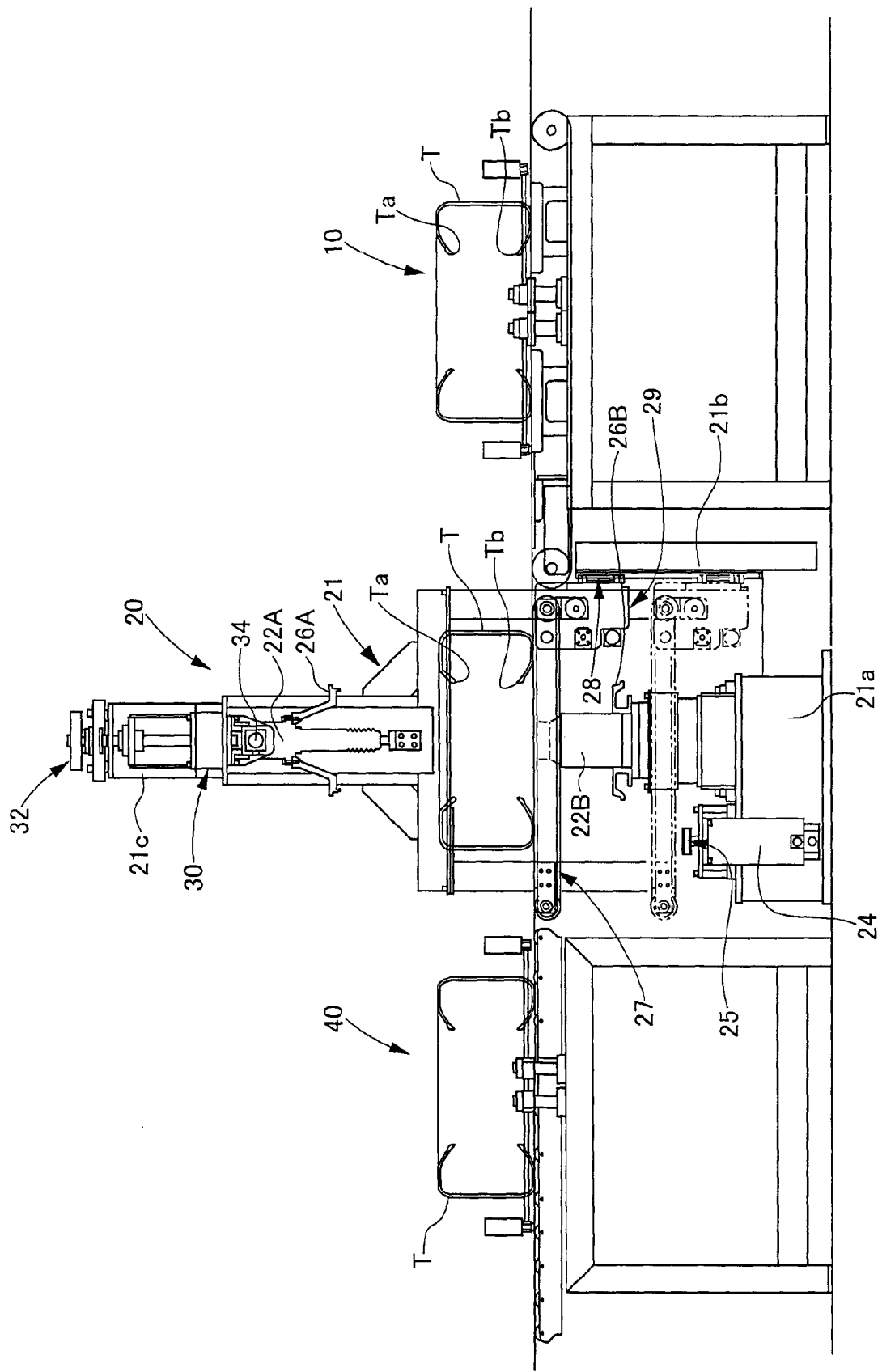
FIG. 1 is a front view of a tire uniformity machine showing Embodiment 1 of the present invention.
Figure 2:
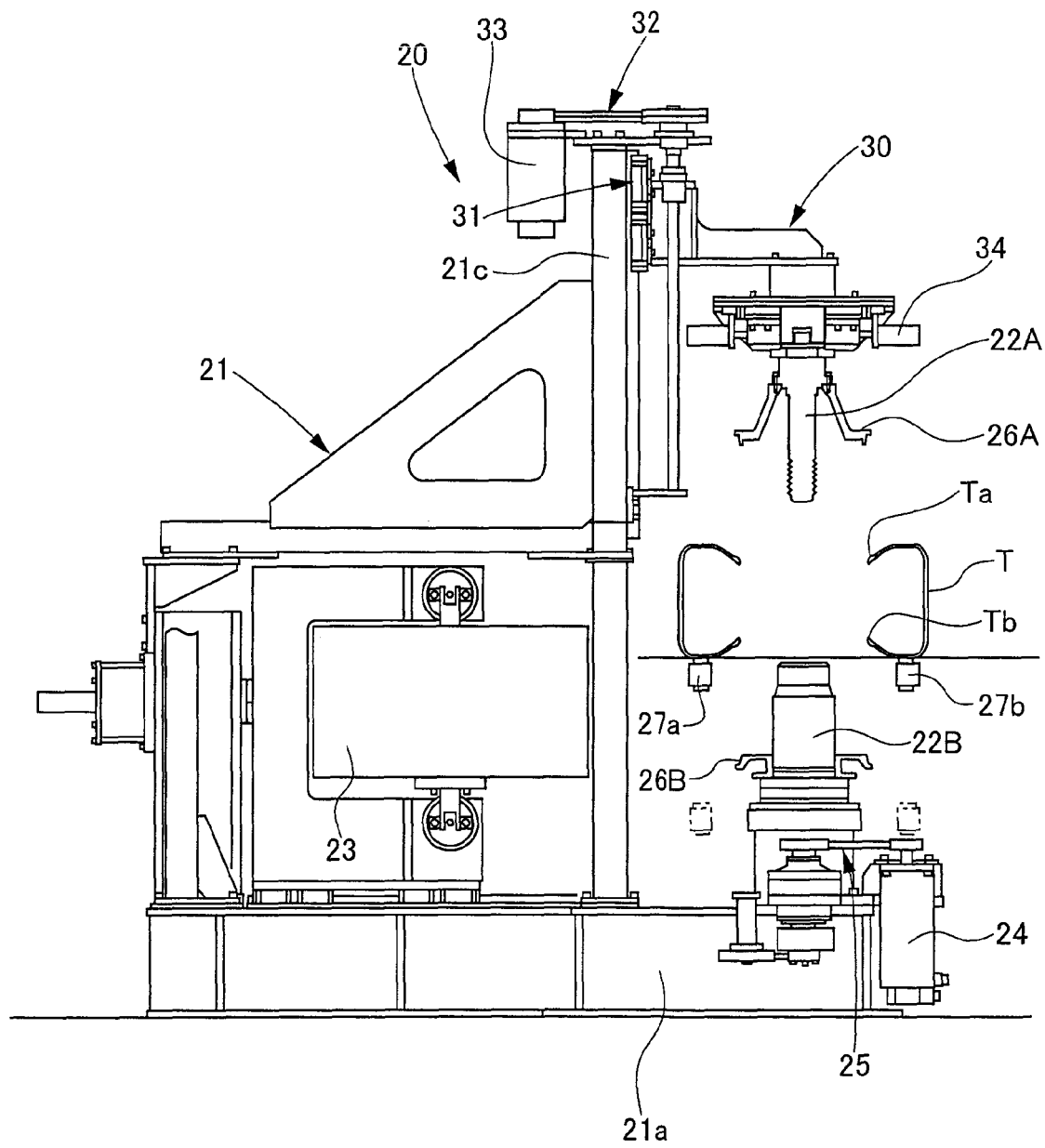
FIG. 2 is a side view of the tire uniformity machine.
Figure 3A:
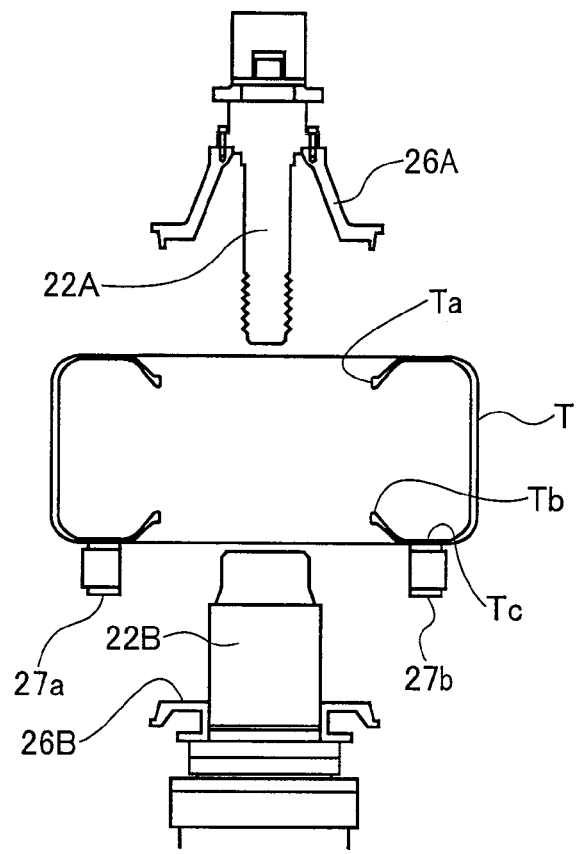
FIG. 3A is an explanation drawing of actions during inflation with air in the tire uniformity machine.
Figure 3B:
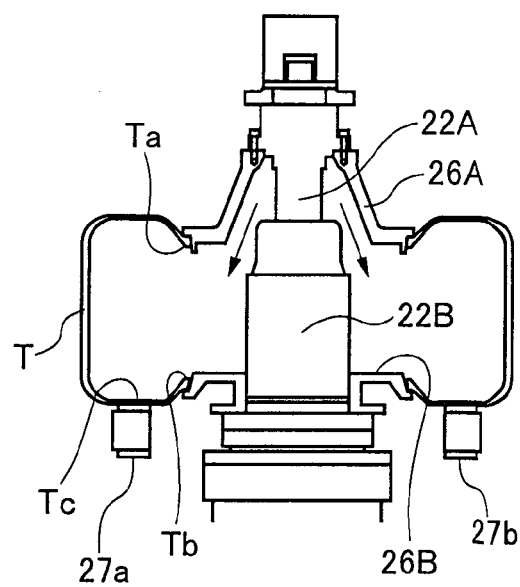
FIG. 3B is an explanation drawing of the actions during inflation with air in the tire uniformity machine.

FIG. 1 is a front view of a tire uniformity machine showing Embodiment 1 of the present invention. FIG. 2 is a side view of the tire uniformity machine. FIGS. 3A and 3B are explanation drawings of actions during inflation in the tire uniformity machine.

As shown in FIGS. 1 and 2, the present tire uniformity machine as a tire testing machine has a bead lubrication unit 10 as a preceding device, a measurement unit 20 as a measuring device, and a marking unit 40 as a succeeding device, which are disposed sequentially from an upstream side in a tire transport direction (tire flow direction).

The bead lubrication unit 10 is a station for coating a lubricating material on an upper bead portion Ta and a lower bead portion Tb of a tire T to be tested (called a test tire T), including centering of the test tire T.

The measurement unit 20 is a station for measuring the nonuniformity of the test tire T with the use of a road wheel 23, which is disposed to oppose a direction orthogonal to the tire transport direction, and a dimension measuring sensor or the like (not shown), the test tire T being supported by a testing machine body 21 so as to be rotationally drivable via an upper spindle 22A and a lower spindle 22B (to be described later).

The marking unit 40 is a station for marking required sites of the test tire T whose nonuniformity was measured by the measurement unit 20.

The lower spindle 22B in the measurement unit 20 is rotationally driven on a platform 21a of the testing machine body 21 by a driving means, such as a servomotor 24, via a wrapping connector such as a belt 25. The lower spindle 22B has, fitted beforehand therewith, a lower rim 26B for holding the lower bead portion Tb of the test tire T.

On a lower frame 21b of the testing machine body 21, a belt conveyor (tire transport device) 27 constituting a part of a tire transport line is supported to be ascendable and descendable between an ascent-limit position (solid line position in FIGS. 1 and 2), which corresponds to the tire transport line, and a descent-limit position (dashed double-dotted line in FIGS. 1 and 2), which is even lower than a position where the test tire T is entrusted to the lower rim 26B, by the action of an elevating device (lifter) 29 comprising a servomotor or the like (not shown) via a guide means such as a linear guide 28. The belt conveyor 27, as shown in FIG. 2, has a pair of belts 27a and 27b separated from each other by a predetermined distance and, during its ascent or descent, the lower spindle 22B and the lower rim 26B are inserted between the pair of belts 27a and 27b.

On an upper frame 21c of the testing machine body 21, a rim elevator (elevating device) 30 is supported to be ascendable and descendable by the action of a driving means such as a servomotor 33 via a guide means such as a linear guide 31 and a wrapping connector such as a belt 32. The upper spindle 22A fitted beforehand with an upper rim 26A is supported on the rim elevator 30 by a publicly known chuck mechanism (not shown) and a chuck opening and closing cylinder 34.

Thus, the rim elevator 30 ascends and descends, with the axis of the upper spindle 22A being in agreement with the axis of the lower spindle 22B. By this action, when the rim elevator 30 descends, a lower part of the upper spindle 22A is inserted into the interior of the lower spindle 22B, and then coupled (locked) thereto at a predetermined insertion position by a publicly known locking mechanism (not shown).

Because of the above configuration, when the nonuniformity of the test tire T transported onto the belt conveyor 27 of the measurement unit 20 along the tire transport line (see FIGS. 1 and 2) is to be measured, air is supplied between the upper rim 26A and the lower rim 26B to inflate the test tire T, with the upper and lower bead portions Ta and Tb of the test tire T being fitted to the upper and lower rims 26A and 26B beforehand at the position of measurement.

That is, as shown in FIG. 3B, the belt conveyor 27 (see the belts 27a, 27b) is first lowered to entrust the lower bead portion Tb of the test tire T to the lower rim 26B fitted beforehand to the lower spindle 22B. At this time, the belt conveyor 27 is not lowered to the descent limit (the dashed double-dotted line in FIG. 1 where the test tire T can be rotated), but is stopped at an intermediate position, whereby the weight of the test tire T is shouldered by the belt conveyor 27 as well.

The intermediate stop position of the belt conveyor 27 is a position where the weight of the test tire T can be supported in a shared manner by the lower rim 26B at the lower bead portion Tb and the belt conveyor 27 at the side wall Tc. This position can be changed arbitrarily in accordance with the prescribed rim width dimension and the tire width dimension of the test tire T.

Then, the upper spindle 22A on standby above the test tire T, as shown in FIG. 3A, is lowered, whereby its lower part is inserted into the lower spindle 22B and locked there. As a result, the upper rim 26A fitted beforehand to the upper spindle 22A is fitted to the upper bead portion Ta of the test tire T, as shown in FIG. 3B.

In the above-mentioned manner, the upper and lower rims 26A and 26B are fitted, respectively, to the upper and lower bead portions Ta and Tb of the test tire T. In this state, air is supplied between the upper and lower rims 26A and 26B by a publicly known air supply means to inflate the test tire T (see arrows in FIG. 3B).

Figure 4:
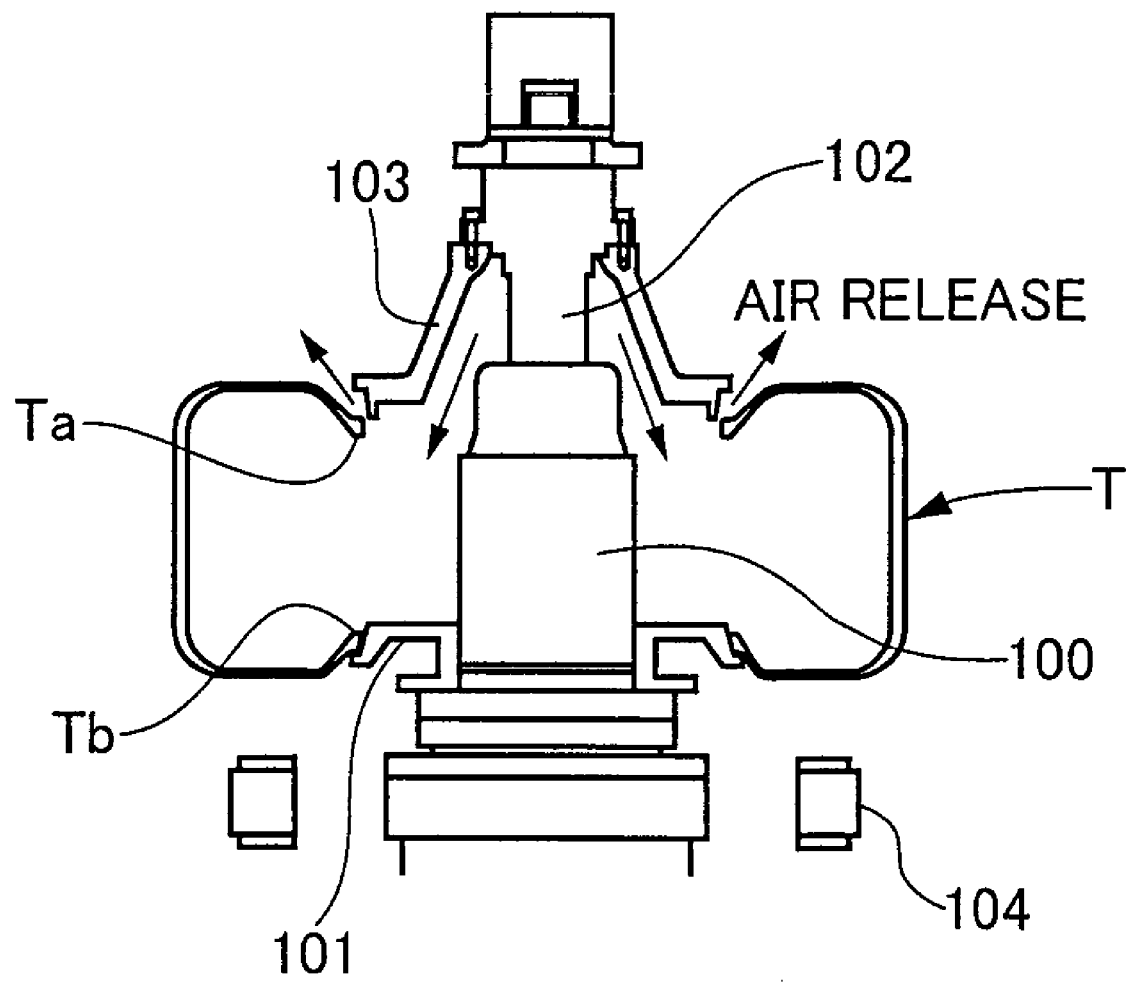
FIG. 4 is an explanation drawing showing a deficiency during conventional inflation with air.

On this occasion, support for the weight of the test tire T is shared between the lower rim 26B at the lower bead portion Tb and the belt conveyor 27 at the side wall Tc. Thus, even if the weight of the test tire T is great, or even if the side wall Tc of the test tire T is soft, the upper bead portion Ta of the test tire T is prevented from sagging under its own weight (see FIG. 4).

As a result, the appearance of a clearance between the upper rim 26A and the upper bead portion Ta of the test tire T during tire inflation is suppressed, so that air leakage is prevented, and inflation can be completed reliably. Advisably, the timing of completion or expected completion of this inflation is judged by detecting the air pressure within the test tire T and, after this timing is reached, the belt conveyor 27 is lowered to the descent limit, and required test and processing in the tire uniformity machine are initiated.

As described above, the inflation method of the present embodiment enables inflation with air to be completed reliably by a simple method of slightly changing the ascending or descending action of the belt conveyor 27 which is the existing equipment. Thus, this inflation method is highly reliable, requires no dedicated equipment, and does not induce a cost increase.

Moreover, the elevating control of the rim elevator 30 by the servomotor 33 is added to the lifting control of the belt conveyor 27 by the servomotor. By this measure, the descent of the upper rim 26A (upper spindle 22A) is once stopped at a position where the rim width of the upper rim 26A is narrower than the prescribed rim width, and then the upper rim 26A is raised to a position corresponding to the prescribed rim width in accordance with the above-mentioned inflated state of the test tire T. These features, needless to say, can prevent air leakage even further, and complete inflation with air reliably.

It goes without saying that the present invention is not limited to the above embodiment, and various changes and modifications may be made without departing from the gist of the present invention. For example, the tire testing machine is not limited to the tire uniformity machine, and a testing device for fitting a completed tire to a rim and measuring it, such as a dynamic balancing machine for measuring the imbalance of a tire, can be applied as the tire testing machine. Furthermore, the tire transport device is not limited to the belt conveyor, but may be a roller conveyor or an alternative means.

[Industrial Applicability]

The inflation method for a tire testing machine according to the present invention is preferably used in a testing machine for a pneumatic tire of an automobile or the like.

[Reference Signs List]

10 Bead lubrication unit
20 Measurement unit
21 Testing machine body
21a Platform
21b Lower frame
21c Upper frame
22A Upper spindle
22B Lower spindle
23 Road wheel
24 Servomotor
25 Belt
26A Upper rim
26B Lower rim
27 Belt conveyor (tire transport device)
28 Linear guide
29 Elevating device (lifter)
30 Rim elevator
31 Linear guide
32 Belt
33 Servomotor
34 Chuck opening and closing cylinder
40 Marking unit
T Test tire
Ta Upper bead portion
Tb Lower bead portion
Tc Side wall

What is claimed is:

1. An inflation method for a tire testing machine, the tire testing machine being configured such that a test tire transported onto a tire transport device is entrusted to a lower rim by lowering the tire transport device; with the test tire so entrusted, an upper rim is lowered to a position of the lower rim, whereby the upper and lower rims are fitted to the test tire; and then air is supplied between the upper and lower rims to inflate the test tire, the inflation method comprising:
stopping the tire transport device at an intermediate position, without lowering the tire transport device to a descent limit, when entrusting the test tire to the lower rim by lowering the tire transport device; and
inflating the test tire, with a weight of the test tire being shouldered by the tire transport device as well.

2. The inflation method for a tire testing machine according to claim 1, wherein the intermediate position of the tire transport device when stopped can be arbitrarily changed in accordance with a prescribed rim width dimension and a tire width dimension of the test tire.

* * * * *